Dec. 1, 1936.  G. M. MARR  2,062,466
CONVECTION TYPE ELECTRIC RADIATOR
Filed July 13, 1934
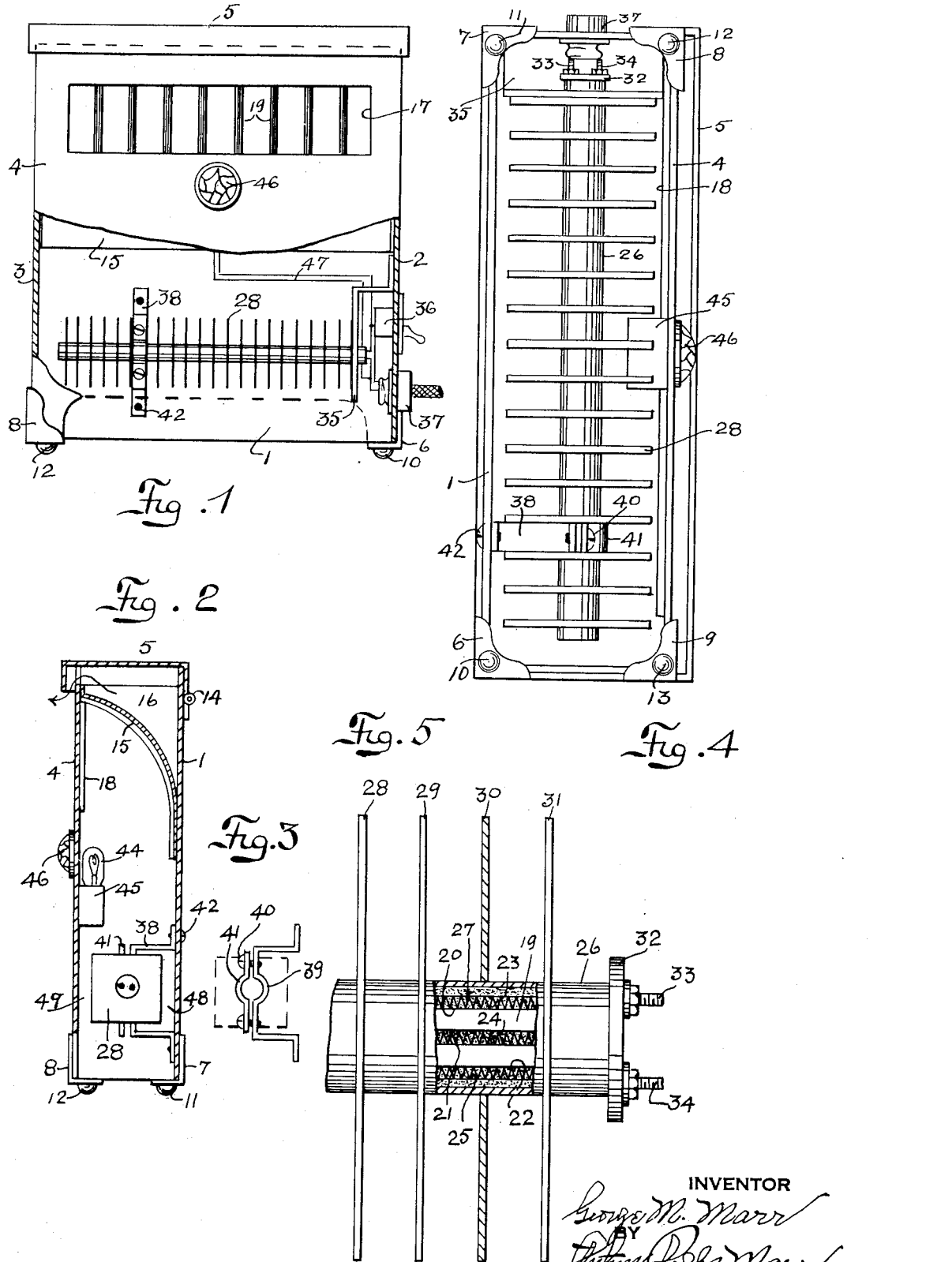

Patented Dec. 1, 1936

2,062,466

UNITED STATES PATENT OFFICE 2,062,466

CONVECTION TYPE ELECTRIC RADIATOR

George M. Marr, New York, N. Y., assignor to Air Conditioners, Inc., New York, N. Y., a corporation of Delaware Application July 13, 1934, Serial No. 734,930

3 Claims. (Cl. 219—38)

This application is filed as a continuation in part of an application filed by me January 10th, 1931, Serial No. 507,819, wherein is shown a number of constructions of devices somewhat similar to that found in this present application, and the object of the present application is to present in detail a construction that I have found, after long experimentation, to be best suited for the purposes intended and as shall be described.

The device the subject of this invention, is an electric heater, sometimes termed an electric radiator and is of the convector type, wherein the heating element is arranged in a casing so proportioned that the circulation of air through the casing caused by the heating of the electrical element, will carry off the heat from the electrical element as it is formed.

The important features of this invention reside in the arrangement and proportioning of the parts, which assures that the heat generated in the electrical element will be carried away as fast as it is generated and at such a speed as will maintain the electrical element well below its critical working temperature.

Another important feature of this invention is the arrangement of the electrical element within a member provided with heat dissipating fins or projections which serve to transmit the heat to the air, not only increasing the heat of the air, but also increasing the speed thereof, as the air of a convector travels at a rate determined by the change of temperature of the air.

Another important feature of this invention, is the arrangement of the heating element and its fin projections in such a manner that the surrounding casing is always maintained relatively cool. This is desirable as it prevents the casing heating to a point where it might inflict burns upon a person or devices that might come in contact therewith.

Another important feature of the invention is the means for protecting the electrical element, so that contact with current carrying parts thereof is made exceedingly difficult, if not impossible. This feature increases the safety of my device, making short circuits highly improbable and preventing electric shocks, which might result from contact with the current carrying parts.

Other features of the invention include the baffling means which not only prevents heating of the top of the device, but also increases the air speed through the device, the peculiar means for securing the electrical element within the casing, the construction of the electrical element itself, the illuminating means which indicates that the device is in operation and the supporting means which insures that the device cannot be so placed that adequate air currents cannot pass therethru, and a feature that must not be overlooked, as I consider it of very great importance, is the humidifier, which is formed as a part of the baffling means and is arranged so that the evaporation therefrom will be intimately mixed with the heated air passing through my device and therefore will prevent the produced humidity from becoming deposited or condensed local to the device itself. All of these features will be referred to and for the most part described in detail in the specification which follows, and the accompanying drawing should be referred to for a complete understanding of that specification.

In the drawing:

Figure 1 is a fractured front elevation of my device,

Figure 2 is a side elevation thereof, the casing being shown in section,

Figure 3 shows in detail a clamping means,

Figure 4 is an enlarged reversed plan view of my device and

Figure 5 is a fractured side elevation of my heating unit and parts adjacent thereto.

Similar reference numerals indicate like parts in all the figures where they appear.

My device consists of a casing formed with a back 1, side members 2 and 3, a front 4 and a top 5. The bottom of the casing is permanently open and adjacent to the bottom, I provide corner pieces as shown at 6, 7, 8 and 9, each of which is in turn provided with projections as shown at 10, 11, 12 and 13 which support the casing above and away from the surface upon which it may be placed. These projections 10 to 13 inclusive assure that under no conditions can my device be so placed as to limit the air passing therethru, which limitation might result in overheating of the electrical element to be later described.

The enclosing members 1, 2, 3 and 4 may be formed in any desirable manner and if formed of separate parts, may be spot welded together so as to make one integral whole. The cover 5 should however be hinged and a cover hinge is shown at 14, and within the casing and under the cover 5, I arrange a peculiarly shaped baffle member 15 which serves a double purpose, that of directing the air currents out of the casing and preventing them reaching the cover 5 and also of producing a pan as suggested at 16 into which water may be introduced, therefore allowing the pan formed by the baffle 15 and the water contained therein, to serve as an efficient humidifier.

High up in the front 4, I produce an oblong opening 17 and behind this opening, I arrange a grid 18 which may consist of a plurality of bars as shown at 19 and which is secured by spot welding or otherwise to the front member 4, and it will be noted that the opening 17 is adjacent to the uppermost edge of the baffle 15, so that the heated air will be caused to pass directly out of the opening and not be pocketed within the casing.

The heating element of my device and the parts associated therewith, are best shown in Figure 5. The heating element consists of a core member 19 formed of Lavarite or some other highly refractory material, having a plurality of recesses formed therein and as shown at 20, 21 and 22. In each of these recesses, I arrange a coil of resistance wire, each coil extending the full length of the core member 19, and in Figure 5 I show three such coils as indicated at 23, 24 and 25, but as the core member 19 is round except for the depressions 20, 21 and 22, and as these depressions are evenly spaced about the core member, it will be understood that I provide a plurality, usually six coils of resistance wire. The size of the wire, the length of the coils and the length of the core member and even the number of coils, will be determined entirely by the wattage capacity of my device. The arrangement of the coils makes my device non-inductive and therefore it can be safely employed even adjacent to a device influenced by induction or magnetism.

The core 19 and the wires separated thereby, are arranged in a tubular member 26, and at 27 I show a layer of cement which has been forced between the wires which make up the heating coils and which also serves the core member and its wire coils insulating and separating the core and either wires from the tube 26.

Upon the tube and secured thereto, I arrange a plurality of fins or plates, the number of such fins or plates will be determined by the length of the tube 26 and by the capacity of my device. In Figure 5 I show four of these plates as indicated at 28, 29, 30 and 31, but in Figures 1 and 4 I show that a plurality of such plates will be employed, and in these figures I indicate only a single plate by the reference character 28, as to indicate each plate separately would serve no particular purpose.

As shown in Figures 1 and 4, the tubular member and its separated plates extend almost the complete width of my casing: one end of the tubular member is provided with an insulating disk 32 and mounted upon this disk are the wire terminals 33 and 34. The resistance wire previously referred to is connected to these terminals and in mounting my device in my casing, this terminal carrying end of the tube 26 is passed through a member 35, which is so formed as to be secured by spot welding or otherwise, to the side member 2 of the casing. The lower end of the member 35 is not secured, in fact it extends only a short distance below the next adjacent plate or fin 28. The object of this member 35 is to cover the terminals of the heater element and also the switch, which is shown at 36 and the wire inlet bushing 37, and the reason for providing this member 35 with a free and projecting portion, is to allow the device to be readily assembled and to further provide a resilient support for one end of the tubular member, so that this member may be readily centered within my casing.

At 38 I show a clamping device which is shown in detail in Figure 3. This clamping device consists of a bridge member having a depression 39 adapted to receive the tube 26 and a clamping member secured by screws 40 also has a depressed portion 41 adapted to engage the tube 26, and it is between the depressions 39 and 41 that the tube is reliably secured. I prefer that this clamp 38 be secured by screws, such as indicated at 42, this construction materially assisting in allowing the heater element to be introduced into a previously formed casing.

Before leaving the heating element, may I call attention to the fact that the fins or plates 28 are preferably square and are in close thermal contact with the tube 26. I have found that square plates with the heating element arranged mid-center thereof, are most efficient and that the area of these plates should only be sufficient to properly conduct the heat delivering it to the passing air. Plates of greater area retain too much of the heat to themselves and of course as they present a greater surface, slow down the air currents. I also provide that the plates be spaced from the casing at the sides, as well as at the top and bottom as previously suggested, so as to provide air channels 48 and 49 between the edges of the plates and the front and back members of my casing.

As the heating element of my device is wholly enclosed, there is no radiation and therefore no glow, and as sensible heat will in such a device be generated rather slowly, it is desirable that I provide means for indicating when the device is in operation. This means consists of a small lamp 44 mounted in a suitable support 45 and arranged directly behind a bull's-eye, or glass covered opening as shown at 46. This lamp would of course be connected so as to be controlled at the switch 36 as suggested by the conductor 47.

It will of course be understood that the size of all of the parts will be varied depending of course upon the desired capacity of the completed heater, and it will further be appreciated that parts may be used without the whole and modifications made within the scope of the appended claims, without departing from the principle or sacrificing the advantages of this invention.

Having carefully and fully described my invention, what I claim and desire to obtain is:

1. An electric heater of the convection type comprising a casing, provided with air inlet and an air outlet port; an electrical heating element arranged in said casing and adjacent the air inlet thereof; said electrical element being spaced from all sides of said casing and free of contact therewith; means for securing said electric element and an L shaped bracket for supporting one end of said electric element and shielding the contacts thereof.

2. An electric heater of the convection type, comprising a casing, a tubular member having a plurality of plates secured thereto and arranged in said casing, a heating element within said tube and consisting of a plurality of noninductively wound coils of resistance wire spaced apart within said tube, and means for supporting said tube comprising a plurality of brackets one of which is approximately L shaped and of a width about equal to the inner width of said casing and arranged to cover and shield the electric terminals of said tubular member and means for securing said brackets to said casing.

3. In a device of the character described, a casing, a heating element and radiator plates associated therewith and arranged in said casing, an arched deflector within said casing and extending the full length and the full width thereof and serving to form a humidifying pan therein, a pilot light arranged in said casing, an independently formed grille adjacent said deflector and a hinged cover for said casing, all combined for joint operation as herein set forth.

GEORGE M. MARR.